UNITED STATES PATENT OFFICE.

LEO DAFT, OF RUTHERFORD, NEW JERSEY, ASSIGNOR TO ELECTRO-CHEMICAL RUBBER AND MANUFACTURING COMPANY, A CORPORATION OF NEW JERSEY.

RUBBER-COVERED ARTICLE AND METHOD OF MAKING THE SAME.

1,120,794.     Specification of Letters Patent.     Patented Dec. 15, 1914.

No Drawing.     Application filed June 3, 1910. Serial No. 564,840.

*To all whom it may concern:*

Be it known that I, LEO DAFT, a subject of the King of Great Britain, and a resident of Rutherford, in the county of Bergen and State of New Jersey, have invented a new and Improved Rubber-Covered Article and Method of Making the Same, of which the following is a description.

My invention relates to a new rubber covered article and the method of making the same by attaching rubber to metals by direct vulcanization of the rubber to the metal.

It has heretofore been the practice to attach rubber to metal by the use of shellac or gums, or otherwise produce a mechanical adhesion between the two. These methods of attaching the rubber are, as is well known, unsatisfactory by reason of the weakness of the bond between the rubber and the metal, making them liable to separation at the point of juncture.

By means of my improved method I am enabled to produce a perfect adhesion between the rubber and the metal. In this manner a bond is produced between the rubber and the metal which is as strong as, or stronger than the neighboring parts of the rubber and will therefore not loosen. My improved method consists essentially in heating the rubber while in contact with metal containing an alloy of antimony. In practising this method the rubber may be heated while in direct contact with a metal base or article provided that base or article is an alloy of antimony or if such metal base or article is not such an antimony alloy and therefore has not the proper surface, then a surface of an alloy of antimony is first applied to such metal base or article, preferably by electro-plating, as hereinafter described and the rubber is then heated while in contact with said coated surface. The alloy of antimony which I prefer to use is one containing antimony combined with copper and zinc. The proportions of these various metals I find best adapted to secure a perfect union between most grades of commercial rubber and the metal alloy are Copper _____ 3¼ lbs.
Zinc _____ 1¾ "
Antimony _____ 3 oz.

These proportions are suitable for all grades of commercial rubber containing five per cent. of sulfur or an equivalent in the form of sulfids but, however, are not exact for all grades of rubber, for, when the rubber contains a relatively large amount of sulfid of antimony, the amount of antimony contained in the alloy may be proportionately decreased.

My method may be carried out as follows: When the metal base to which the rubber is to be attached is itself an alloy of antimony, the surface of the base or article should be first thoroughly cleaned by means of emery wheels or by any other suitable method. The rubber is then brought into direct contact with the surface of this metal alloy base or article and placed in a vulcanizer and vulcanized to it at a high temperature, say, 245 to 300 degrees Fahrenheit. This heating vulcanizes the rubber and produces a strong bond between the alloy and the rubber. When, however, it is impracticable to form the base, to the surface of which the rubber is to be attached, of an alloy of antimony, as, for instance, by casting, I confer upon such base or article a surface of an alloy of antimony and attach the rubber to that surface in the same manner as to the surface of a base or article of the antimony alloy itself. This may be most conveniently done by electro-plating the base or article to which the rubber is to be attached with an alloy of antimony. The electro-plating may be done by any suitable method. In the practice of my invention I prefer to provide an electro-plating bath made up of the following ingredients in approximately the following proportions:

Sodium carbonate _____ 10 oz.
Sodium bisulfid _____ 10 "
Copper carbonate _____ 3½ "
Zinc carbonate _____ 3½ "
Antimony chlorid _____ ½ "
Water _____ 320 "
Potassium cyanid, a quantity sufficient to dissolve the precipitate.

The base or article to be plated is placed in this bath and electroplated at a potential of approximately 2 to 3½ volts, until a surface of sufficient thickness of the alloy of antimony shall have been deposited thereon.

Another plating bath which I find to give good results is compounded in the following manner: I dissolve 15¾ ounces of sodium carbonate in 5 quarts of water and dissolve 5¼ ounces of copper sulfate and 5¼ ounces of zinc sulfate in 5 quarts of water. I then mix these two solutions together, thus producing a precipitation of copper and zinc carbonate. I then add a solution obtained by dissolving half an ounce of metallic antimony in hot sulfuric acid (specific gravity 1.800) and precipitating with an excess of ammonium sulfid. After the precipitate has settled I pour off the clear fluid and add about 6 quarts of water to the precipitate and then gradually add 7 ounces of sodium carbonate and 7 ounces of soda bisulfid. I then add 8¾ ounces of potassium cyanid and clear the bath with 30 grains of arsenious acid dissolved in 10 ounces of water. This bath is used in the same manner as that described above.

Still another method of plating a surface upon the base or article to which rubber is to be attached, is by the use of a transfer solution containing the following ingredients:

| | |
|---|---|
| Crystal soda bisulfid | 14¾ oz. |
| Crystal ammonium chlorid | 9½ " |
| Potassium cyanid | 2½ " |
| Water | 10 qts. |

When using these baths I prefer to use an anode made of an alloy containing the same proportions of copper, zinc and antimony as above referred to, viz:

| | |
|---|---|
| Copper | 3¼ lbs. |
| Zinc | 1¾ " |
| Antimony | 3 oz. |

It will be noted that the first two baths referred to contain the salts of copper, zinc and antimony, while the last of the above-mentioned baths is strictly a transfer solution in which the metals are transferred from the anode to the bath and from the bath to the article to be plated.

All of the methods of electro-plating which I have thus far described can be used where the base or article, to the surface of which the rubber is to be attached, does not contain copper and zinc, but when it is desired to practise my invention upon a metal base or article which already contains copper and zinc, such as brass or bronze, then the electro-plating bath may consist of antimony without copper or zinc in solution. In this case I prefer to use a bath composed of the sodium salt of sulfantimonic acid (commonly known as "Schlippe's salt") in the proportion of 1¾ ounces of the salt to 35 ounces of water. Electro-plating for a very short time in this bath is sufficient. It will be obvious that in this case the anode need not be of antimony, zinc and copper, and when using this solution I preferably use an anode of carbon, the electro-plating taking place by the decomposition of the bath itself.

I do not intend to confine myself to the precise proportions of the various ingredients set forth above, nor to the use of the identical ingredients themselves, as many of them have well known chemical equivalents. Nor do I intend to confine myself to the exact method described of causing the rubber to adhere to the metal, it being evident that all of these may be varied within relatively wide limits without departing from the spirit of my invention. In my co-pending application No. 605,170, I have described and claimed another method of electro-plating which may be used in practising the invention described and claimed herein.

What I claim and desire to secure by Letters Patent of the United States is:

1. The method of attaching rubber to metals, which consists in depositing an antimony alloy upon the surface of the metal, bringing rubber containing a vulcanizing agent into engagement with the surface thus treated, and vulcanizing said rubber upon said surface.

2. The method of attaching rubber to metals, which consists in depositing antimony and copper upon the surface of the metal, bringing rubber containing a vulcanizing agent into engagement with the surface thus treated, and vulcanizing said rubber upon said surface.

3. The method of attaching rubber to metals, which consists in depositing upon the surface of the metal to be treated an alloy of copper, zinc and antimony, bringing rubber containing a vulcanizing agent into engagement with said alloy, and vulcanizing said rubber upon said alloy.

4. A new article of manufacture, consisting of a metal base having a non-stannous surface formed thereon and containing antimony, copper and zinc with a rubber covering vulcanized thereon.

5. The method of attaching rubber to metals which consists in depositing antimony upon the surface of the metal by electro-deposition, bringing rubber containing a vulcanizing agent into engagement with the surface thus treated and vulcanizing the rubber upon said surface.

6. The method of attaching rubber to metals which consists in depositing an antimony alloy upon the surface of the metal by electro-deposition, bringing rubber containing a vulcanizing agent into engagement with the surface thus treated and vulcanizing the rubber upon said surface.

7. The method of attaching rubber to metals which consists in electroplating the metal in an electrolyte containing antimony and copper, obtaining a deposit containing antimony and copper, bringing rubber containing a vulcanizing agent into engagement with the surface thus treated, and vulcanizing said rubber upon said surface.

8. The method of attaching rubber to metals which consists in electro-plating a base of an alloy of copper and zinc in a solution of antimony, bringing rubber containing a vulcanizing agent into contact with the surface, thus formed, and vulcanizing the rubber to the surface.

9. The method of attaching rubber to metals which consists in electro-plating a base of an alloy of copper and zinc in a solution of Schlippe's salt, bringing rubber containing a vulcanizing agent into contact with the surface thus formed and vulcanizing the rubber to the surface.

In testimony whereof I have signed my name to this specification in the presence of two subscribing witnesses.

LEO DAFT.

Witnesses:
WALTON HARRISON,
PHILIP D. ROLLHAUS.